(12) United States Patent
Nyga et al.

(10) Patent No.: US 11,733,507 B2
(45) Date of Patent: Aug. 22, 2023

(54) OPTICAL DEVICE, METHOD OF USING THE SAME, AND METHOD OF MAKING THE SAME

(71) Applicant: Purdue Research Foundation, West Lafayette, IN (US)

(72) Inventors: Piotr Nyga, West Lafayette, IN (US); Alexander V. Kildishev, West Lafayette, IN (US); Sarah Nahar Chowdhury, West Lafayette, IN (US); Alexandra Boltasseva, West Lafayette, IN (US); Zhaxylyk Kudyshev, West Lafayette, IN (US); Vladimir M. Shalaev, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 580 days.

(21) Appl. No.: 16/794,964

(22) Filed: Feb. 19, 2020

(65) Prior Publication Data
US 2020/0285043 A1    Sep. 10, 2020

Related U.S. Application Data

(60) Provisional application No. 62/807,606, filed on Feb. 19, 2019.

(51) Int. Cl.
*G02F 1/01* (2006.01)
*G02B 26/00* (2006.01)

(52) U.S. Cl.
CPC ........ *G02B 26/007* (2013.01); *G02F 1/0147* (2013.01); *G02B 2207/101* (2013.01); *G02F 2203/10* (2013.01)

(58) Field of Classification Search
CPC ............ G02B 26/007; G02B 2207/101; G02B 5/008; G02B 1/14; G02F 1/0147; G02F 2203/10; B82Y 20/00; B82Y 40/00
USPC ................................ 359/237, 238, 290, 291
See application file for complete search history.

(56) References Cited

U.S. PATENT DOCUMENTS

| | | | |
|---|---|---|---|
| 11,567,249 B2* | 1/2023 | Misawa | C25B 11/04 |
| 2016/0160364 A1* | 6/2016 | Juluri | C25B 11/051 |
| | | | 204/252 |

OTHER PUBLICATIONS

Vorobyev, A., "Enhanced absorptance of gold following multipulse femtosecond laser ablation", Physical Review, 2005, 72, 195422, pp. 5.
Cui, X., et al., "Plasmonic Color Laser Printing inside Transparent Gold Nanodisk-Embedded Poly (dimethylsiloxane) Matrices", Advanced Optical Materials, 2019, 1901605, pp. 8.
Kristensen, A., et al., "Plasmonic colour generation", Nature Reviews Materials, 2016, pp. 14.
Nyga, P., et al., "Mid-IR plasmonics and photomodification with Ag films", Applied Physics B, 2008, 93, pp. 59-68.
(Continued)

*Primary Examiner* — Tuyen Tra
(74) *Attorney, Agent, or Firm* — Purdue Research Foundation (57) ABSTRACT

An optical device, wherein the optical device includes a dielectric layer over a mirror layer. The optical device further includes a plurality of plasmonic nanoparticles over the dielectric layer. Additionally, the optical device includes a protective layer over the plurality of plasmonic nanoparticles.

20 Claims, 6 Drawing Sheets
(6 of 6 Drawing Sheet(s) Filed in Color)

(56) References Cited

OTHER PUBLICATIONS

Ooms, M., et al., "Disposable Plasmonics: Rapid and Inexpensive Large Area Patterning of Plasmonic Structures with CO2 Laser Annealing", American Chemical Society, 2015, 31, pp. 5252-5258.
Roberts, A., et al., "Laser Writing of Bright Colors on Near-Percolation Plasmonic Reflector Arrays", American Chemical Society, 2019, 13, pp. 71-77.
Song, M., et al., "Colors with plasmonic nanostructures: A full-spectrum review", Applied Physics Reviews, 2019, 6 041308, pp. 26.
Zhu, X., et al., "Plasmonic colour laser printing", Nature Technology, 2015, 11, pp. 325-329.
Zijlstra P., et al., "Five-dimensional optical recording mediated by surface plasmons in gold nanorods", Nature, 2009, 659, pp. 410-413.

\* cited by examiner

OPTICAL DEVICE, METHOD OF USING THE SAME, AND METHOD OF MAKING THE SAME

CROSS-REFERENCE TO RELATED APPLICATIONS

The present U.S. patent application is related to and claims the priority benefit of U.S. Provisional Patent Application Ser. No. 62/807,606, filed Feb. 19, 2019, the contents of which is hereby incorporated by reference in its entirety into this disclosure.

ACKNOWLEDGEMENT OF GOVERNMENT SUPPORT

This invention was made with government support under FA9550-17-1-0243 and FA9550-14-1-0389 awarded by the United States Air Force and under HR0011-17-2-0032 awarded by the Defense Advanced Research Projects Agency. The government has certain rights in the invention.

TECHNICAL FIELD

This disclosure relates to an optical device, method of using the same, and method of making the same.

BACKGROUND

This section introduces aspects that may help facilitate a better understanding of the disclosure. Accordingly, these statements are to be read in this light and are not to be understood as admissions about what is or is not prior art.

Increased resolution for color images has been a driving force for innovation in the development of mainstream printing technologies. The existing methods of using dye-doped polymers have not only reached their limits in terms of pixel size, but these techniques are also hazardous and detrimental to the environment. Hence, alternative methods of color generation are needed.

SUMMARY

Plasmonic materials have been used for centuries for aesthetic purposes, but very recently coloration with plasmonic nanostructures has been utilized for sub-wavelength resolution printing. Color generation with such nanostructures and metasurfaces demonstrates better performance over dye technology; however, it remains costly owing to fabrication methods such as e-beam lithography or focused ion beam milling. The generation of structural colors with plasmonics (plasmonic colors) is achieved by fabricating metallic nanostructures that resonate at different frequencies at different areas of a substrate, thus producing a color image.

Among the many plasmonic types of structures, semi-continuous metal films (SMFs) that are comprised of random, fractal-type, island films are appealing. These films can be fabricated on large substrates using physical vapor deposition techniques, thus potentially allowing for large-scale production. The optical properties of SMFs strongly depend on the fine details of the nanostructures formed on the substrate, which are in turn a function of deposition process parameters. SMFs in the form of isolated particles, percolated planar structures, or almost continuous films can be fabricated by varying for example the mass of the deposited metal. When light interacts with SMFs, localized surface plasmon resonances, which are collective oscillations of conduction electrons, can be excited in the metallic structures, and electromagnetic energy can be localized in nanoscale regions called "hotspots" where the local electric field can be orders of magnitude higher than in other parts of the film. Films near the percolation threshold (the transition from dielectric-like to metal-like) are comprised of nanostructures with different particle sizes and shapes, resulting in absorption of electromagnetic energy in a broad wavelength range extending from the visible to the far infrared. An advantage about SMFs is that different parts of the nanostructured film are responsible for absorption at different wavelengths.

Laser modification of SMFs can induce spectral selective changes in their transmittance, reflectance and absorption. These changes originate from reshaping and fragmentation of metallic nanostructures due to heat accumulation in the vicinity of hotspots excited with the laser. Such photomodification allows for a gradual change of the optical response of SMFs, which can result in forming windows of transparency in the mid-infrared spectral range and high transmission bands in the near-infrared. A similar effect can be observed in the case of semi-continuous films synthesized on dielectric micro- and nanoparticles. Spectrally selective laser photomodification of plasmonic SMFs could be used for color generation. Laser writing on semi-continuous gold films has been studied recently for coloration.

One aspect of the present application relates to an optical device, wherein the optical device includes a dielectric layer over a mirror layer. The optical device further includes a plurality of plasmonic nanoparticles over the dielectric layer. Additionally, the optical device includes a protective layer over the plurality of plasmonic nanoparticles.

Another aspect of the present application relates to an optical device, wherein the optical device includes a dielectric layer over a mirror layer. The optical device further includes an adhesive layer over the dielectric layer. Moreover, the optical device includes a plurality of nanorods over the adhesive layer.

Still another aspect of the present application relates to a method of forming an optical device, wherein the method includes forming a dielectric layer over a mirror layer. The method additionally includes forming an adhesion layer over the dielectric layer. Moreover, the method includes forming a plurality of nanorods over the adhesion layer.

Moreover, another aspect of the present application relates to a method of using an optical device, wherein the method includes receiving an incident light at a plurality of plasmonic nanoparticles. Moreover, the method includes inducing light-matter interaction between the incident light and the plurality of plasmonic nanoparticles, thereby producing resonant plasmon modes. Further, the method includes interacting the resonant plasmonic nanoparticles with a mirror layer, thereby producing plasmon modes in a region between the mirror layer and the plurality of plasmonic nanoparticles. Moreover, the method includes producing a reflected color by the plasmon modes. Next, the method includes receiving a laser light at a selected spot of the plurality of plasmonic nanoparticles, thereby modifying a morphology of the selected spot of the plurality of plasmonic nanoparticles. The method further includes changing a spectral content and associated plasmon modes of the selected spot of the plurality of plasmonic nanoparticles.

Further, another aspect of the present application relates to a method of using an optical device, wherein the method includes receiving an incident light at a plurality of nanorods. Moreover, the method includes inducing light-matter interaction between the incident light and the plurality of nanorods, thereby producing resonant plasmon modes. Further, the method includes interacting resonant nanorods with at least one of a mirror layer or an adhesive layer, thereby producing plasmon modes in a region between at least one of the mirror layer or the adhesive layer, and the plurality of nanorods. Moreover, the method includes producing a reflected color by the plasmon modes. Next, the method includes receiving a laser light at a selected spot of the plurality of nanorods, thereby modifying a morphology of the selected spot of the plurality of nanorods. The method further includes changing a spectral content and associated plasmon modes of the selected spot of the plurality of nanorods.

BRIEF DESCRIPTION OF DRAWINGS

The patent or application file contains at least one drawing executed in color. Copies of this patent or patent application publication with color drawing(s) will be provided by the Office upon request and payment of the necessary fee.

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

Various embodiments of the present application relate to coloration using semi-continuous metal films, as they are generally inexpensive, environmentally-friendly, and non-bleaching. Various embodiments relate to the generation of bright colors through laser modification of semi-continuous Ag films. A palette of colors is obtained from blue through green, orange, up to red, and the potential exists to obtain other hues through varying the scan speed, number of pulses, energy density, power, and exposure time. This unique process can be applied to the macroscopic, mesoscopic and nanoscopic printing of innovatory fade-free artistic images as one example of application.

Multiple embodiments of the present application relate to procedures of fabrication of semi-continuous Ag films on glass and multilayer structures formed from a silver SMF on a silver reflector/mirror with a dielectric spacer. The present application discusses the colors of these structures and also describes a process of color printing through femto second layer (or other type of laser, such as CW, ns, μs, ps) post-processing of semi-continuous silver films deposited on a mirror with a spacer. The laser printing results in the formation of vibrant green, brown, red, orange, and yellow colors. Such colors originate from the spectral changes of reflection of multilayer samples induced by reshaping of the metallic nano structures.

Example 1

An embodiment of the present disclosure relates to an optical device, wherein the optical device includes a dielectric layer over a mirror layer. The optical device further includes a plurality of plasmonic nanoparticles over the dielectric layer. Additionally, the optical device includes a protective layer over the plurality of plasmonic nanoparticles. In one of more embodiments, the protective layer is transparent. In various embodiments, the dielectric layer has an absorption band to modify the spectrum of the reflected color.

The substrate includes at least one of glass, parylene, silicon, germanium, gallium arsenide, polymer, stainless steel, titanium, aluminum, copper, quartz, fused silica, sapphire, polyester, aluminum nitride, graphene or indium-tin-oxide. The wetting layer includes at least one of germanium, titanium, aluminum, Yttrium oxide ($Y_2O_3$), silicon monoxide (SiO), nickel, InAs, GaAs, or chromium. The dielectric layer includes silicon dioxide, $TiO_2$, $Al_2O_3$, $MgF_2$, $HfO_2$, $ZrO_2$, Calcium Fluoride, $CaF_2$, $BaF_2$, $Ta_2O_5$, MgO, ZnO, parylene, or polymer. In some embodiments, the dielectric layer includes at least one of composite medium, gain medium, active medium, or nonlinear medium.

The mirror layer includes at least one of silver, gold, aluminum, copper, platinum, palladium, titanium, titanium nitride, zirconium nitride, hafnium nitride, aluminum, scandium, or aluminum doped silver. Each plasmonic nanoparticle of the plurality of plasmonic nanoparticles includes at least one of silver, gold, aluminum, platinum, palladium, titanium, titanium nitride, zirconium nitride, copper, scandium, aluminum, or aluminum doped silver. Each plasmonic nanoparticle of the plurality of plasmonic nanoparticles ranges from approximately 10 nm to 10000 nm. The protective layer includes at least one of silicon dioxide, $TiO_2$, $Al_2O_3$, $MgF_2$, $HfO_2$, $ZrO_2$, Calcium Fluoride, $CaF_2$, $BaF_2$, $Ta_2O_5$, MgO, ZnO, parylene, or polymer. The protective layer has a thickness ranging from approximately 5 nm to approximately 10 μm. In various embodiments, the protective layer is configured to shift a spectrum of a reflected color. In one or more embodiments, the protective layer is configured to broaden a spectrum of a reflected color.

Example 2

Another embodiment of the present disclosure relates to an optical device, wherein the optical device includes a dielectric layer over a mirror layer. The optical device additionally includes an adhesive layer over the dielectric layer. Moreover, the optical device includes a plurality of nanorods over the adhesive layer. Further, the optical device includes a substrate, wherein the mirror layer is over the substrate. Next, the optical device includes a wetting layer, wherein the wetting layer is over the substrate. The optical device additionally includes a protective layer over the plurality of nanorods. In various embodiments, the protective layer has an absorption band to modify the spectrum of the reflected color.

The substrate includes at least one of glass, parylene, silicon, germanium, gallium arsenide, polymer, stainless steel, titanium, aluminum, copper, quartz, fused silica, sapphire, polyester, aluminum nitride, graphene or indium-tin-oxide. The wetting layer includes at least one of germanium, titanium, aluminum, Yttrium oxide ($Y_2O_3$), silicon monoxide (SiO), nickel, InAs, GaAs, or chromium. The mirror layer includes at least one of silver, gold, aluminum, copper, platinum, palladium, titanium, titanium nitride, zirconium nitride, hafnium nitride, aluminum, scandium, or aluminum doped silver. The dielectric layer includes silicon dioxide, $TiO_2$, $Al_2O_3$, $MgF_2$, $HfO_2$, $ZrO_2$, Calcium Fluoride, $CaF_2$, $BaF_2$, $Ta_2O_5$, MgO, ZnO, parylene, or polymer. In some embodiments, the dielectric layer includes at least one of composite medium, gain medium, active medium, or nonlinear medium. In one of more embodiments, the protective layer is transparent. In some embodiments, the protective layer includes at least one of composite medium, gain medium, active medium, or nonlinear medium.

Each nanorod of the plurality of nanorods comprises at least one of silver, gold, aluminum, platinum, palladium, titanium, titanium nitride, zirconium nitride, copper, aluminum, or aluminum doped silver. The protective layer comprises at least one of silicon dioxide, $TiO_2$, $Al_2O_3$, $MgF_2$, $HfO_2$, $ZrO_2$, Calcium Fluoride, $CaF_2$, $BaF_2$, $Ta_2O_5$, MgO, ZnO, parylene, or polymer. The adhesive layer comprises at least one of silver, gold, aluminum, platinum, palladium, titanium, titanium nitride, zirconium nitride, copper, aluminum, $Y_2O_3$, SiO, nickel, or chromium.

Example 3

A method of forming an optical device includes forming a dielectric layer over a mirror layer. Additionally, the method includes forming an adhesion layer over the dielectric layer. Furthermore, the method includes forming a plurality of nanorods over the adhesion layer. In one or more embodiments, the forming the plurality of nanorods over the adhesion layer includes depositing plasmonic material onto the adhesion layer while the optical device is inverted at an angle and rotating, wherein the adhesion layer is facing a deposition apparatus.

Example 4

A method of using an optical device includes receiving an incident light at a plurality of plasmonic nanoparticles. The method further includes inducing light-matter interaction between the incident light and the plurality of plasmonic nanoparticles, thereby producing resonant plasmon modes. Additionally, the method includes interacting the resonant plasmonic nanoparticles with a mirror layer, thereby producing plasmon modes in a region between the mirror layer and the plurality of plasmonic nanoparticles. Moreover, the method includes producing a reflected color by the plasmon modes. The method further includes receiving a laser light at a selected spot of the plurality of plasmonic nanoparticles, thereby modifying a morphology of the selected spot of the plurality of plasmonic nanoparticles. Next, the method includes changing a spectral content and associated plasmon modes of the selected spot of the plurality of plasmonic nanoparticles. The method further includes changing the reflected color of the selected spot of the plurality of plasmonic nanoparticles.

The modifying the morphology of the selected spot of the plurality of plasmonic nanoparticles includes at least one of melting, reshaping, restructuring, fragmentation, or sintering the selected spot of the plurality of plasmonic nanoparticles. The plasmon modes are gap plasmon modes.

Example 5

A method of using an optical device includes receiving an incident light at a plurality of nanorods. Additionally, the method includes inducing light-matter interaction between the incident light and the plurality of nanorods, thereby producing resonant plasmon modes. Moreover, the method includes interacting resonant nanorods with at least one of a mirror layer or an adhesive layer, thereby producing plasmon modes in a region between at least one of the mirror layer or the adhesive layer, and the plurality of nanorods. Further, the method includes producing a reflected color by the plasmon modes. The method additionally includes receiving a laser light at a selected spot of the plurality of nanorods, thereby modifying a morphology of the selected spot of the plurality of nanorods. Next, the method includes changing a spectral content and associated plasmon modes of the selected spot of the plurality of nanorods. In at least one embodiment, the method also includes interacting at least two nanorods of the plurality of nanorods with each other, thereby producing the plasmon modes in a region of the at least two nanorods. Moreover, the method includes changing the reflected color of the selected spot of the plurality of nanorods.

The modifying the morphology of the selected spot of the plurality of nanorods includes at least one of melting, reshaping, restructuring, fragmentation, or sintering the selected spot of the plurality of nanorods. The plasmon modes includes gap plasmon modes. In one or more embodiments, the region between the mirror layer and the plurality of plasmonic nanoparticles comprises a dielectric layer. In at least one embodiment, the protective layer has an absorption band to modify the spectrum of the reflected color. In various embodiments, the protective layer is configured to red-shift a spectrum of a reflected color.

Example 6

A method of forming an optical device includes forming a dielectric layer over a mirror layer. In at least one embodiment, the dielectric layer is formed using a metalorganic chemical vapor deposition (MOCVD) process. In some embodiments, the dielectric layer is formed using molecular beam epitaxy (MBE), hydride vapor phase epitaxy (HVPE), or other suitable formation method.

In at least one embodiment, the mirror layer is formed over a substrate using a metalorganic chemical vapor deposition (MOCVD) process. In some embodiments, the mirror layer is formed using molecular beam epitaxy (MBE), hydride vapor phase epitaxy (HVPE), or other suitable formation method. In at least one embodiment, a wetting layer is formed between the substrate and the mirror layer using any of the above fabrication methods.

The method additionally includes forming an adhesion layer over the dielectric layer. In at least one embodiment, the adhesion layer is formed using a metalorganic chemical vapor deposition (MOCVD) process. In some embodiments, the adhesion layer is formed using molecular beam epitaxy (MBE), hydride vapor phase epitaxy (HVPE), or other suitable formation method.

Next, the method includes forming a plurality of nanorods over the adhesion layer. In at least one embodiment, the plurality of nanorods is formed using a metalorganic chemical vapor deposition (MOCVD) process. In some embodiments, the plurality of nanorods is formed using molecular beam epitaxy (MBE), hydride vapor phase epitaxy (HVPE), or other suitable formation method. In at least one embodiment, the forming the plurality of nanorods includes depositing plasmonic material onto the adhesion layer while the optical device is inverted at an angle and rotating, wherein the adhesion layer is facing a deposition apparatus.

One of ordinary skill in the art would recognize that operations are added or removed from method, in one or more embodiments. One of ordinary skill in the art would also recognize that an order of operations in the above method is able to be changed, in some embodiments.

Example 7

A method of forming an optical device includes forming a wetting layer over a substrate. In at least one embodiment, the wetting layer is formed using a metalorganic chemical vapor deposition (MOCVD) process. In some embodiments, the wetting layer is formed using molecular beam epitaxy (MBE), hydride vapor phase epitaxy (HVPE), or other suitable formation method.

The method further includes forming a mirror layer over the wetting layer. In at least one embodiment, the mirror layer is formed over the substrate using a metalorganic chemical vapor deposition (MOCVD) process. In some embodiments, the mirror layer is formed using molecular beam epitaxy (MBE), hydride vapor phase epitaxy (HVPE), or other suitable formation method.

Next, the method includes forming a dielectric layer over the mirror layer. In at least one embodiment, the dielectric layer is formed over the mirror layer using a metalorganic chemical vapor deposition (MOCVD) process. In some embodiments, the dielectric layer is formed using molecular beam epitaxy (MBE), hydride vapor phase epitaxy (HVPE), or other suitable formation method.

Further, the method includes forming a plurality of plasmonic nanoparticles over the dielectric layer. In at least one embodiment, the plurality of plasmonic nanoparticles is formed over the dielectric layer using a metalorganic chemical vapor deposition (MOCVD) process. In some embodiments, the plurality of plasmonic nanoparticles is formed using molecular beam epitaxy (MBE), hydride vapor phase epitaxy (HVPE), or other suitable formation method.

Additionally, the method includes forming a protective layer over the plurality of plasmonic nanoparticles. In at least one embodiment, the protective layer is formed over the plurality of plasmonic nanoparticles using a metalorganic chemical vapor deposition (MOCVD) process. In some embodiments, the protective layer is formed using molecular beam epitaxy (MBE), hydride vapor phase epitaxy (HVPE), or other suitable formation method.

One of ordinary skill in the art would recognize that operations are added or removed from method, in one or more embodiments. One of ordinary skill in the art would also recognize that an order of operations in the above method is able to be changed, in some embodiments.

The above structures were fabricated using an electron-beam physical vapor deposition technique on 75 mm×25 mm glass substrates (ThermoFisher Scientific, Gold Seal Plain Slide). The glass surface roughness was 0.5 nm. The substrates were pre-cleaned with Nanostrip, a sulfuric acid and hydrogen peroxide solution, and then sonicated in solvents (toluene, acetone and isopropyl alcohol) and dried thoroughly. The deposition was conducted in a high-vacuum deposition chamber (base pressure $2.6 \times 10^{-6}$ Torr) at room temperature. Silicon dioxide ($SiO_2$) 99.99% purity and silver 99.99% purity were used for fabricating all structures. The thickness of the deposited materials was monitored with quartz crystal microbalance, which provided thickness values of an equivalent continuous film. The deposition rate was maintained constant at 1 Å/s for all materials.

Two types of SMFs were fabricated in the study. The first type was the silver SMF on glass on which 10 nm of silica was deposited in the same process. The thickness of the Ag was varied across the length of the sample through the use of the computer-controlled shutter. Before the Ag deposition, the shutter completely shadowed the substrate from the deposition material. As the deposition started, the shutter was slowly moved with a constant speed and exposed the substrate to the Ag material flux. Thus, one edge of the substrate was exposed to the deposited material longer than the opposite edge. That procedure allowed the fabrication of the SMF with the gradient of Ag thickness ranging from 0 nm to 20 nm on a single substrate. The second type of sample was a multilayer formed from a silver SMF on a silver reflector/mirror with a silica spacer. In that case, a thin layer of titanium (5 nm) was deposited on the glass to increase the adhesion of Ag to substrate. Next, 100 nm of Ag was deposited, followed by 32 nm $SiO_2$ as a spacer, and then, by the Ag SMF. All layers were fabricated in the same deposition process.

Post-fabrication laser photo-modification of the SMFs on the mirror was performed in ambient atmosphere using an ultrafast femtosecond laser (1 kHz, 80 fs, 800 nm, linear polarization). The laser beam was focused using a single lens. The $1/e^2$ beam size was determined using the knife edge technique. In order to print areas of uniform color, samples were mounted on a motorized XY stage capable of scanning and controlled with a computer interface. A field emission scanning electron microscope (FESEM, Hitachi S-4800) was used to characterize the SMF's nanostructure. We used an optical microscope (Nikon Eclipse, L150) to capture color images of printed structures. Total transmittance and reflectance of our as-fabricated and photomodified structures were measured using a spectrophotometer (Perkin Elmer, Lambda 950) equipped with an integrating sphere module. Spectralon was used as a reference sample. The transmittance of SMFs on glass was measured using a variable angle spectroscopic ellipsometer (JA Woollam, VASE) at an angel of incidence of 18° with p-polarized incident light. The calculation of CIE 1931 color coordinates from transmittance and reflectance spectra was performed using Origin software.

The structure and optical properties of silver SMFs deposited on dielectric substrates are sensitive to the fabrication process parameters. Silver films grow according to the Volmer-Weber growth mode. At thicknesses on the order of few nanometers, silver forms islands. As more metal is deposited, the islands coalesce, then form randomly shaped fractal clusters, and finally merge into a continuous film. Thus, for thin metal films, a small variation of thickness can result in striking changes in the nanostructure and result in drastic changes in the transmittance, reflectance and absorption of the film. Hence, a key understanding of the morphology of the metal film with the change of thickness is required for developing SMF structures for structural color applications.

Figure 1A:
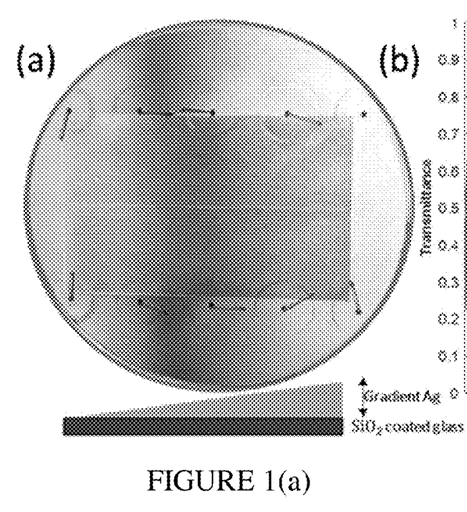
FIG. 1(a) illustrates an optical camera image of freshly fabricated sample on a older used for mounting in a deposition chamber.

In order to efficiently study the color of SMFs as a function of the mass of deposited silver, we fabricated a sample with a gradient of Ag thickness. The film was deposited on a glass substrate coated with 10 nm $SiO_2$ by employing a computer-controlled stepper-motor shutter. The silver thickness on this sample changed linearly with distance from 0 nm on one end to 20 nm on the other end. FIG. 1(a) illustrates an optical camera image of freshly fabricated sample on a holder used for mounting it in the deposition chamber. A schematic edge view of such a sample with linearly varied thickness is also presented. Here, we observe a broad variety of exquisite colors obtained as a consequence of the varying Ag thickness which is especially pronounced on the left side ("thinner side") of the sample (for Ag thickness up to about 10 nm). A correlation between the Ag thickness and the color can be obtained through the transmittance spectra in FIG. 1(b). These spectra were measured using an ellipsometer at several locations corresponding to silver thicknesses from 0.4 nm to 19.5 nm. No reflectance spectra were measured for this sample.

Figure 1B:
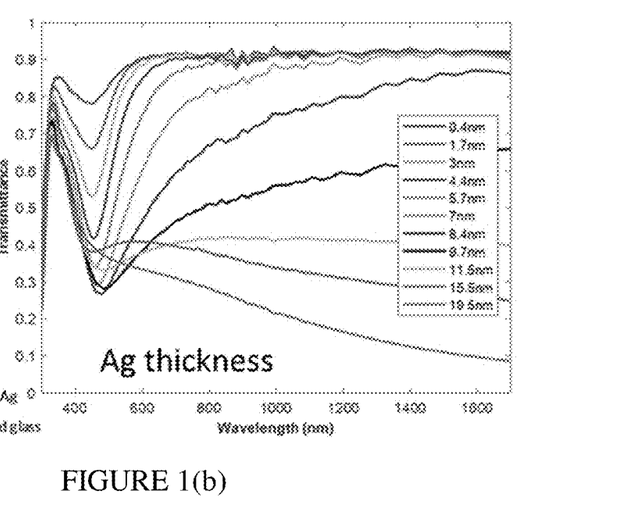
FIG. 1(b) illustrates transmittance spectra of Ag gradient sample measured at locations corresponding to different mass.

We can explicitly see that, with a gradual increase of the silver thickness, at first a dip in transmission is observed that then broadens and shifts toward longer wavelengths. This dip is a result of the absorption and scattering of light by silver nanoparticles. As more metal is deposited, the dip in transmission broadens, and transmission decreases for longer wavelengths as gradually more light is absorbed or reflected by the film. This observation is corroborated by our previous work on SMFs.

Figure 2:
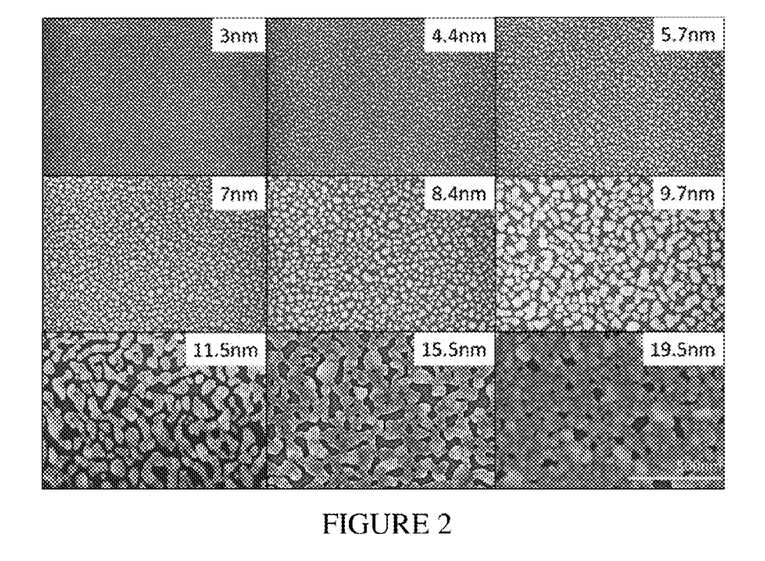
FIG. 2 illustrates SEM images of the gradient in Ag thickness and the percolation threshold.

FIG. 2 illustrates SEM images of the gradient in Ag thickness and the percolation threshold. These images clearly show the growth process for the metal film. At low mass thicknesses, isolated granular silver structures form on the silica-coated glass substrate. With more deposited silver, these granules gradually grow and coalesce, forming larger islands. Eventually the islands merge to form a number of short, connected paths. When a single path connects across the sample, the percolation threshold is reached and the film transitions from dielectric-like to metal-like. Still further metal deposition leads to the formation of a continuous metal film with dielectric voids. These SEM images provided a good estimate for the approximate thickness for our subsequent multilayer structures. As stated above, the absorption of SMFs depends on the grain size and shape, and at an Ag thickness near 10 nm, we can observe the different shapes and sizes contributing to plasmon oscillations in a broad, flat frequency range. As the metal filling factor increases, the individual grains form clusters through coalescence, which eventually leads to a continuous, conducting path. Hence, a semi-continuous film in the range of 8-14 nm is desired to achieve high absorption in the broadest possible range.

Figure 3:
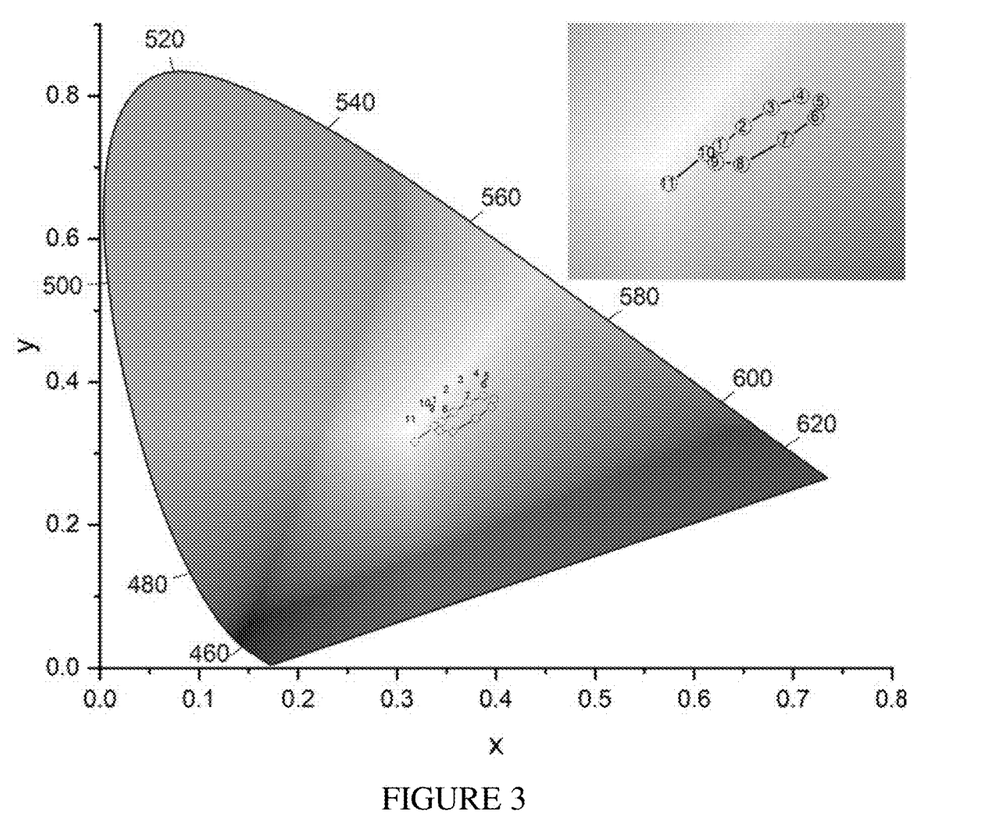
FIG. 3 illustrates the colors of a gradient Ag film at different locations.

In order to better visualize the range of colors of SMFs on glass, we analyzed the spectra presented in FIG. 1 using the CIE 1931 chromaticity diagram (FIG. 3). We decided to analyze the "transmission mode" colors as these films are quite transparent and the observed colors are produced as a result of light transmission through the sample. It is clear that by changing the silver thickness, one can get a rather small variation of colors in the yellow-orange region. Also, the intensity of the produced colors is rather weak. However, after careful examination of the aluminum holder used for the gradient film deposition (FIG. 1(a)), we realized that much more intense colors can be produced when a SMF is deposited on a reflective surface with a dielectric spacer.

Figure 4:
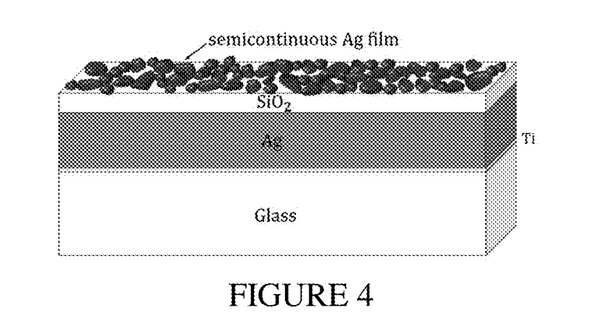
FIG. 4 illustrates a schematic view of Ag SMF on a $SiO_2$ spacer atop silver mirror.

In order to generate colors in "reflection mode," we fabricated silver semicontinuous metal films on mirror (SMF/M) with a dielectric spacer. FIG. 4 illustrates a schematic view of the multilayer structure with randomly generated silver nanoparticles on top. We used 100 nm Ag film deposited on 5 nm titanium on a glass substrate as the mirror. A film of 32 nm thick silicon dioxide layer was the spacer. Such type of a structure allows utilization of gap plasmon mode extensively studied in case of lithography-defined plasmonic structures.

Figure 5:
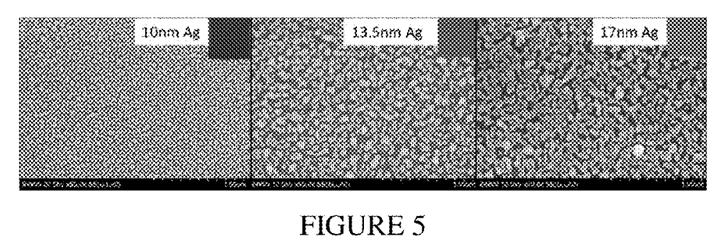
FIG. 5 illustrates SEM images as well as the colors captured with an optical microscope using 0.15 NA 5× objective.
Figure 6A:
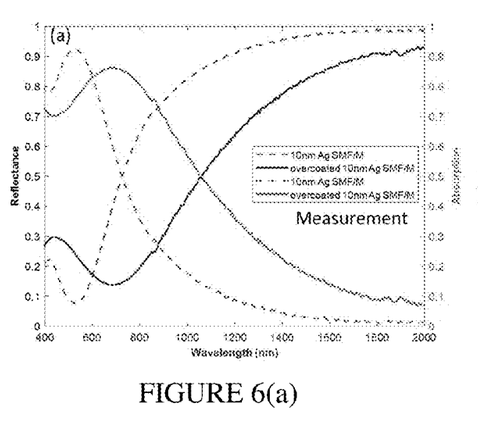
FIG. 6(a) illustrates a comparison of measured and absorption spectra of a 10 nm Ag SMF/M and SMF/M overcoated with a 30 nm layer of $SiO_2$.
Figure 6B:
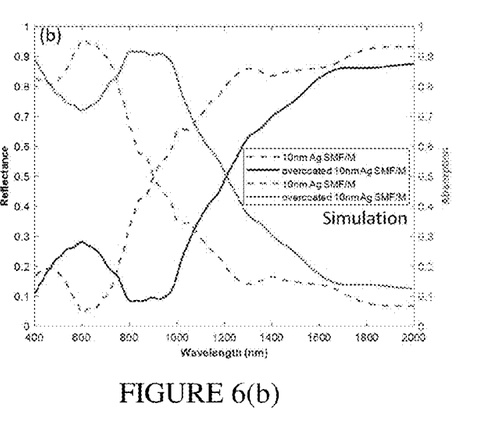
FIG. 6(b) illustrates a simulated reflectance and absorption spectra of a 10 nm Ag SMF/M (Semi-continuous Metal Film over Mirror with spacer) and SMF/M overcoated with a 30 nm layer of $SiO_2$.

In order to study the dependence of reflectance and absorption of SMF/M on the silver thickness, we fabricated three samples with top metal layers of 10, 13.5 and 17 nm. (Note that the Ag mirror ensures no light transmission in the visible and near infrared, so transmittance measurements were not included for these samples.) FIG. 5 shows the SEM images as well as the colors captured with an optical microscope using 0.15 NA 5× objective (inset images). The silver nanostructure of these films is similar to the previous films deposited on glass. As the thickness increases, the metal filling fraction increases, and films become more continuous. For further studies of laser printing we chose the film with a 10 nm thick Ag film as it had the highest absorption in the visible range (reflectance and absorption of this sample are presented in FIG. 6(a)), and thus it had the highest potential for color change.

Our initial tests of laser photomodification of the 10 nm thick SMF/M resulted in a change of color. However, the obtained colors gradually faded with time. We attribute this to the inherent chemical instability of Ag, which is highly susceptible to oxidation/sulfidation. In order to increase the stability of SMF/M, we decided to add a protective layer on top of our semicontinuous silver film. We repeated the deposition of 10 nm Ag SMF/M sample and added 30 nm of $SiO_2$ on top of silver in the same deposition process. An additional advantage of using the silica overcoating layer was the absorption broadening and shift to longer wavelengths, which resulted in an increase of the total absorption in the visible spectral range and blue appearance of the multilayer sample (FIG. 6(a)).

In order to understand the optical properties of SMF/Ms, we simulated the 10 nm Ag samples with and without the silica overcoating. The simulated structures were constructed from the SEM images of the fabricated random metal films for direct numerical simulations with a commercial 3D finite-difference time-domain (FDTD) solver (Lumerical Inc., FDTD Solutions). The images of the structure were binarized and imported into computational domain directly. We used a simulation approach that was similar to our previous studies on semicontinuous films. Here we have assumed that a 20 nm thick silver semicontinuous metal film is sitting on top of the multilayer substrate, which consists of a 32 nm $SiO_2$ spacer and 100 nm silver back reflector. The optical response of the random metallic films is significantly affected by the statistical variation of the nanoparticle sizes within the same film. Hence, in order to obtain a statistical average of the overall response of the film, we simulated a representative number of geometries for each film. To achieve this, we used 25 regions with 500 nm by 500 nm lateral dimension, which allowed us to collect enough statistics for fair averaging of the optical responses. For each of the realizations, we assumed that the unit cell has a periodic boundary condition in the lateral directions. In the second part of the simulations, we considered the same semicontinuous silver film (the same SEM images were used to generate Ag nanostructures) covered by a 30 nm thick protective silica layer.

Here we assumed that 10 nm of $SiO_2$ is filling the gaps inside the semicontinuous silver film (as filling fraction is close to 0.5) and the remaining 20 nm of $SiO_2$ covers the film on top. The $SiO_2$ dielectric constant was assumed to be constant across all wavelengths and equal to 2.12. The dielectric constant of silver was retrieved using ellipsometric measurements from a 100 nm thick Ag mirror fabricated under the same process parameters as for SMF/Ms. The differences in the locations of reflectance dips and absorption peaks could be a result of several factors. First, the simulations were conducted using the material properties of bulk Ag, however thinner films have smaller grain sizes which results in the variation of optical properties. Second, the grain thickness of the Ag top film was approximated to be uniform and equal to 20 nm. Additionally, straight side walls of the Ag structures were assumed. Nevertheless, the broadening and shift of the SMF absorption spectrum were reproduced by the simulations. In addition, simulations confirmed the existence of hotspots in the semicontinuous silver film and showed that the film is responsible for absorption of the multilayer structure. These facts allowed us to expect that similar to the case of SMFs the laser photomodification of SMF/Ms would lead to spectrally selective changes of their reflectance and absorption.

Figure 7A:
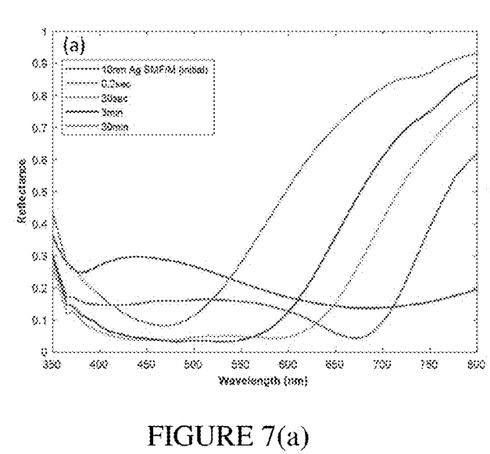
FIG. 7(a) illustrates reflectance measured with linearly polarized light co-polarized with respect to modifying laser polarization.
Figure 7B:
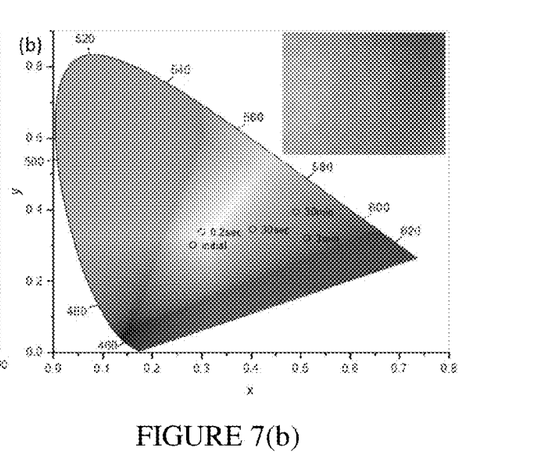
FIG. 7(b) illustrates chromaticity diagram of colors of as-deposited overcoated 10 nm SMF/M (initial) and after different time exposure to 800 nm, 80 fs, 1 kHz laser.

Next we discuss the results of laser printing on silica-overcoated 10 nm silver SMF/M. For laser photomodification we used 1 kHz, 80 fs pulses of linearly polarized laser operating at 800 nm. First, we conducted a study on how color generation depends on photomodification exposure time. The SMF/M was illuminated by a beam with 30 mJ $cm^{-2}$ fluence and $1/e^2$ diameter of few millimeters. The exposure time was varied from 0.2 seconds to 30 minutes. FIG. 7(a) shows the visible spectral range reflectance of the SMF/M photomodified using different exposure times. Reflectance (linearly polarized light, same orientation as that of the photomodifying laser) was measured at the uniform central part of the modified area using a spectrophotometer equipped with an integrating sphere. Laser modification induces an increase in the sample reflection at longer wavelengths, and as the exposure time increases, the high-reflection spectral band progresses toward the shorter wavelengths (from the red to the yellow part of the visible range). Also, it is worth noting that reflection decreases for short wavelengths. Such changes in SMF/M reflectance originate from the localized heat generation (due to absorption of laser light) and restructuring of metal clusters resonating at the 800 nm laser wavelength. With increasing exposure time, this effect leads to a gradual decrease of the absorption of the silver random film and results in an increase of the light reflected from the metallic mirror. In addition, laser-induced restructuring of the silver nanostructures leads to the formation of grains resonating at shorter wavelengths, which results in an increase of the absorption in this part of the visible spectrum. For a short exposure time (0.2 second), a darkening of the film was observed with the naked eye. As the exposure time increased, the film changed gradually to red, orange and yellow. This is in a good correspondence with the reflectance data. In FIG. 7(b), we show the colors induced by laser photomodification of the SMF/M structure plotted on the CIE 1931 Chromaticity diagram. The inset in FIG. 7(b) presents an optical image (captured using a digital camera) of a part of the SMF/M area exposed for 30 minutes. While the central yellow part of the photomodified spot is quite uniform, there is an area with a gradient of colors from green to red to orange to yellow.

Figure 8:
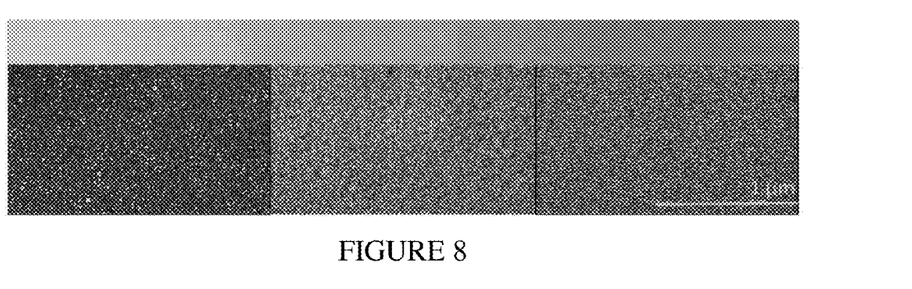
FIG. 8 illustrates SEM images corresponding to different color regions.

FIG. 8 illustrates SEM images of three locations corresponding to different colors (yellow, red, green) obtained from the spot modified for 30 minutes using 30 mJ $cm^{-2}$ fluence. Since the SMF/M studied in this section was overcoated with a 30 nm silica layer, the metal nanostructures of the as-deposited film cannot be observed clearly using electron microscopy. For the same reason, in the region of green and red color we were not able to specifically identify the changes to the film's structure. However, in the yellow color region some silver emerged from the silica layer and metal spherical structures were visible. The formation of spherical nanoparticles upon laser photomodification of semicontinuous metal films was reported previously.

Figure 9A:
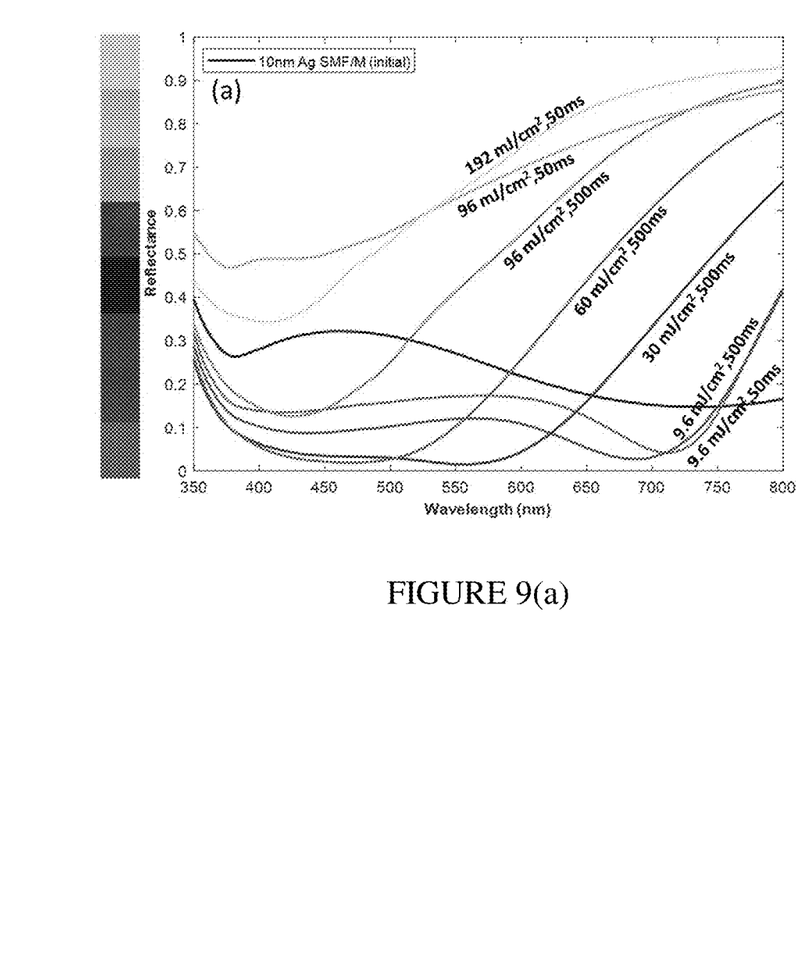
FIG. 9(a) illustrates reflectance spectra of overcoated 10 nm Ag SMF/M structure photomodified with different laser fluence measured with linearly polarized light (co-polarized with respect to modifying laser polarization).
Figure 9B:
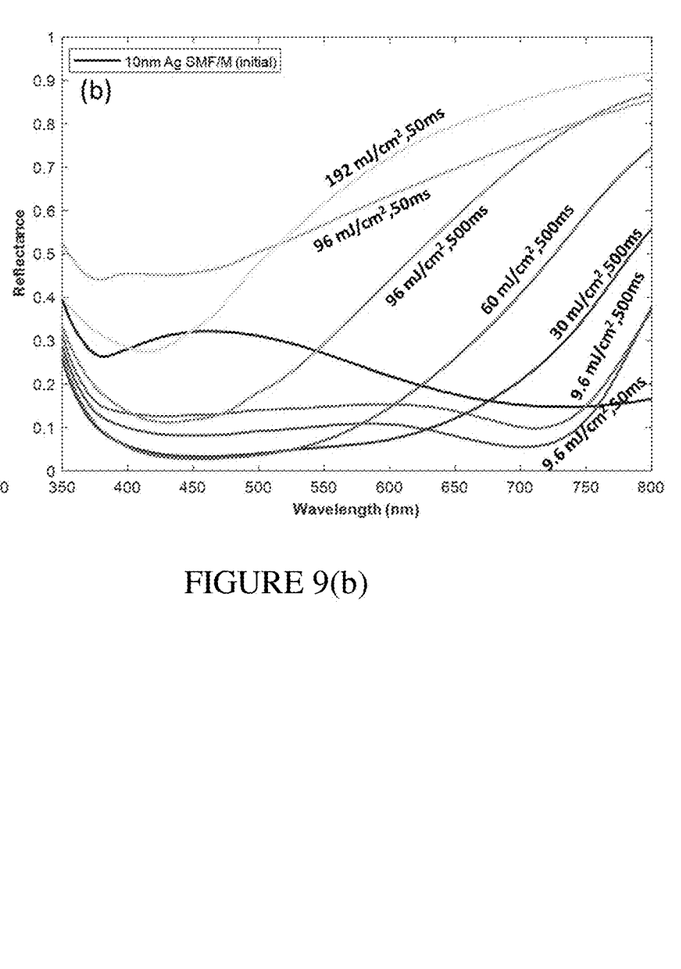
FIG. 9(b) illustrates reflectance spectra of overcoated 10 nm Ag SMF/M structure photomodified with different laser fluence measured with linearly polarized light (cross-polarized with respect to laser polarization)

Next, we explored the influence of laser fluence on color printing on SMF/M. In this case, the laser beam was focused by a single lens to 0.37 mm diameter ($1/e^2$). A few $mm^2$ area was uniformly photomodified employing scanning of the sample across the laser beam. The scanning was performed with a computer-controlled motorized XY stage. We varied the laser fluence in the range of 9.6 mJ $cm^{-2}$-192 mJ $cm^{-2}$. We also changed the exposure time in two cases: one for a high fluence of 96 mJ $cm^{-2}$, and the other for a low fluence of 9.6 mJ $cm^{-2}$. We measured the reflectance of the modified areas using spectrophotometer with an integrating sphere. Linearly polarized light was used. Measurements were performed for co-polarized (FIG. 9(a)) and cross-polarized (FIG. 9(b)) light with respect to photomodifying laser polarization. In FIG. 9, the inset squares represent the generated color palette and are optical images taken using an optical microscope with 0.3 NA 10× objective and unpolarized illumination and collection. The changes of SMF/M reflectance induced by photomodification with different laser fluence resemble those presented in FIG. 7 as a function of exposure time. The changes of reflectance recorded with linear light co-polarized with respect to photomodifying laser polarization show more distinct change in color than the cross-polarized case.

Figure 10A:
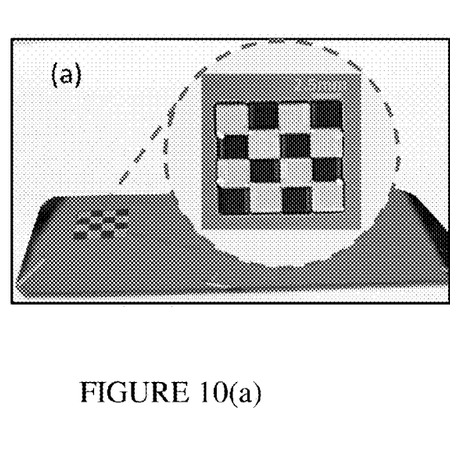
FIG. 10(a) illustrates optical images of laser printed checkered pattern.
Figure 10B:
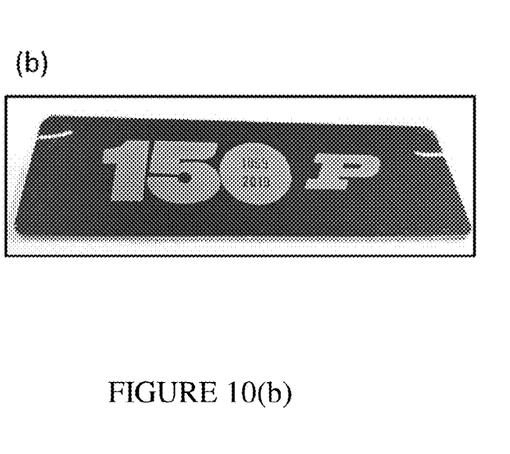
FIG. 10(b) illustrates optical images of laser printed of 150 years of Purdue logo with a "P."

The data presented in FIGS. 7 and 9 reveal that a substantial range of highly contrasting and vivid earth palette colors can be easily obtained through laser photomodification of semicontinuous silver films. FIG. 9 also comprises of range of produced pristine colors: unmodified sample—blue (teal) and laser printed green, orange and red. The control of the generated colors can be achieved by varying either exposure time or laser fluence. The color range generated in this study was not attainable for any of our previous structures. The color palette could be further extended with the use of other plasmonic materials. As an example of decorative type of laser coloring, we printed a simple two-color checkered pattern and 150 years of Purdue logo with a "P" letter (FIG. 10).

A substantial range of highly contrasting and vivid colors is obtained through femtosecond laser irradiation of Ag semicontinuous metal films deposited on mirror with a dielectric spacer. Such changes occur due to restructuring of plasmonic nanostructures resonating at the laser wavelength. Although Ag is usually susceptible to oxidation and sulfidation, our structure covered with a protective layer not only ensures durability, but we also achieve a brighter contrast of color that can be controlled by varying exposure time, laser fluence, and polarization. A palette of colors is obtained from blue through green, orange, up to red. This unique laser printing process can be applied in the future to the formation of macroscopic, mesoscopic and nanoscopic color images.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. An optical device comprising:
   a substrate;
   a wetting layer;
   a dielectric layer over a mirror layer;
   a plurality of plasmonic nanoparticles over the dielectric layer; and
   a protective layer over the plurality of plasmonic nanoparticles,
   wherein the mirror layer and the wetting layer are over the substrate.

2. The optical device of claim 1, wherein the substrate comprises at least one of glass, parylene, silicon, germanium, gallium arsenide, polymer, stainless steel, titanium, aluminum, copper, quartz, fused silica, sapphire, polyester, aluminum nitride, graphene or indium-tin-oxide.

3. The optical device of claim 1, wherein the wetting layer comprises at least one of germanium, titanium, aluminum, Yttrium oxide ($Y_2O_3$), silicon monoxide (SiO), nickel, InAs, GaAs, or chromium.

4. The optical device of claim 1, wherein the mirror layer comprises at least one of silver, gold, aluminum, copper, platinum, palladium, titanium, titanium nitride, zirconium nitride, hafnium nitride, aluminum, scandium, or aluminum doped silver.

5. The optical device of claim 1, wherein the dielectric layer comprises at least one of silicon dioxide, $TiO_2$, $Al_2O_3$, $MgF_2$, $HfO_2$, $ZrO_2$, $Y_2O_3$, $CaF_2$, $BaF_2$, $Ta_2O_5$, MgO, ZnO, parylene, or polymer.

6. The optical device of claim 1, wherein the dielectric layer comprises at least one of composite medium, gain medium, active medium, or nonlinear medium.

7. The optical device of claim 1, wherein each plasmonic nanoparticle of the plurality of plasmonic nanoparticles comprises at least one of silver, gold, aluminum, platinum, palladium, titanium, titanium nitride, zirconium nitride, copper, scandium, aluminum, or aluminum doped silver.

8. The optical device of claim 1, wherein the protective layer comprises at least one of silicon dioxide, $TiO_2$, $Al_2O_3$, $MgF_2$, $HfO_2$, $ZrO_2$, Calcium Fluoride, $CaF_2$, $BaF_2$, $Ta_2O_5$, MgO, ZnO, parylene, or polymer.

9. The optical device of claim 1, wherein the protective layer has a thickness ranging from approximately 5 nm to approximately 10 µm.

10. The optical device of claim 1, wherein the protective layer is transparent.

11. The optical device of claim 1, wherein the protective layer has an absorption band to modify the spectrum of the reflected color.

12. The optical device of claim 1, wherein the protective layer is configured to shift a spectrum of a reflected color.

13. The optical device of claim 12, wherein the protective layer is configured to red-shift a spectrum of a reflected color.

14. The optical device of claim 1, wherein the protective layer is configured to broaden a spectrum of a reflected color.

15. The optical device of claim 1, wherein each plasmonic nanoparticle of the plurality of plasmonic nanoparticles ranges from approximately 10 nm to 10000 nm.

16. A method of using an optical device comprising:
    receiving an incident light at a plurality of plasmonic nanoparticles;
    inducing light-matter interaction between the incident light and the plurality of plasmonic nanoparticles, thereby producing resonant plasmon modes;
    interacting the resonant plasmonic nanoparticles with a mirror layer, thereby producing plasmon modes in a region between the mirror layer and the plurality of plasmonic nanoparticles;
    producing a reflected color by the plasmon modes;
    receiving a laser light at a selected spot of the plurality of plasmonic nanoparticles, thereby modifying a morphology of the selected spot of the plurality of plasmonic nanoparticles; and
    changing a spectral content and associated plasmon modes of the selected spot of the plurality of plasmonic nanoparticles.

17. The method of claim 16, further comprising:
    changing the reflected color of the selected spot of the plurality of plasmonic nanoparticles.

18. The method of claim 17, wherein the modifying the morphology of the selected spot of the plurality of plasmonic nanoparticles comprises:

at least one of melting, reshaping, restructuring, fragmentation, or sintering the selected spot of the plurality of plasmonic nanoparticles.

19. The method of claim 16, wherein the plasmon modes are gap plasmon modes.

20. The method of claim 16, wherein the region between the mirror layer and the plurality of plasmonic nanoparticles comprises a dielectric layer.

* * * * *